United States Patent
Schatz et al.

(10) Patent No.: US 7,070,869 B2
(45) Date of Patent: Jul. 4, 2006

(54) MAGNETIC COMPONENT

(75) Inventors: Günter Schatz, Radolfzell (DE); Manfred Albrecht, Constance (DE); Mireille Maret, Radolfzell (DE); Andreas Maier, Constance (DE); Frank Treubel, Constance (DE)

(73) Assignee: Universität Konstanz, Constance (DE)

( * ) Notice: Subject to any disclaimer, the term of this patent is extended or adjusted under 35 U.S.C. 154(b) by 0 days.

(21) Appl. No.: 10/363,214

(22) PCT Filed: Aug. 9, 2001

(86) PCT No.: PCT/EP01/09228

§ 371 (c)(1), (2), (4) Date: Aug. 6, 2003

(87) PCT Pub. No.: WO02/21545

PCT Pub. Date: Mar. 14, 2002

(65) Prior Publication Data

US 2004/0099919 A1    May 27, 2004

(30) Foreign Application Priority Data

Sep. 7, 2000 (DE) ................................. 100 44 226

(51) Int. Cl.
*G11B 5/64* (2006.01)
*G11B 5/73* (2006.01)

(52) U.S. Cl. ................ 428/692.1; 428/836.1; 428/846.1; 428/847; 428/848.2

(58) Field of Classification Search .................... None
See application file for complete search history.

(56) References Cited

U.S. PATENT DOCUMENTS 4,587,176 A * 5/1986 Carcia ...................... 428/611
5,981,054 A * 11/1999 Hikosaka et al. .......... 428/328
6,103,367 A * 8/2000 Weir et al. ................. 428/336
6,274,220 B1 * 8/2001 Tsukuda et al. ........... 428/141

OTHER PUBLICATIONS

Shapiro, A., Vajk, O., Hellman, F., Ring, K., and Kavanagh, K, App. Phy. Let., 75(26), Dec. 1999, 4177-4179.*
Kleinefeld, Th., Heimel, J., and Weller, D., J. Appl. Phys., 79(8), 1996, 4922 (Abstract only).*
Sharma, N., Casey, S., Jones, G., Grundy, P., J. Mag., Mag., Mat., 193 , 1999, 93-96.*
Nowak, U., Heimel, J., Kleinefeld, T., Weller, D., Phys. Rev. B, 56(13), 1997, 8143-8148.*
Shapiro et al., Growth-induced magnetic anisotropy and clustering in a vapor-deposited Co-Pt alloy films, *Physical Review B*, vol. 60, No. 18, (Nov. 1999), pp. 12,826-12,836.
Maret et al., "Perpendicular magnetic anisotropy in $Co_2Pt_{1-x}$ alloy films," *Thin Solid Films*, vol. 275, (1996), pp. 224-227.
Delaunay et al., "Elongated prolate ellipsoid CoPt nanocrystals embedded in graphite-like C magnetic thin films," *Journal of Magnetism and Magnetic Materials*, vol. 219, (2000), pp. 325-330.
J. Heimel et al., "Exchange decoupling of grains in polycrystalline CoPt alloy films", *J. Appl. Phys.*, vol. 81, No. 8, Apr. 15, 1997, Abstract.

* cited by examiner

*Primary Examiner*—Kevin M. Bernatz
(74) *Attorney, Agent, or Firm*—Sughrue Mion, PLLC

(57) ABSTRACT

The invention relates to an element, comprising a substrate with a surface roughness of less than 5 nm, with saturated bonds on the surface and an $MPt_3$ film applied to at least one side of the substrate, with a magnetic anisotropy perpendicular to the plane of the film, with M=a metal of the $5^{th}$ to $9^{th}$ sub-group of the periodic table, nickel or gadolinium. The invention further relates to a method for production of the above and the use of said elements as a magnetic component, for example as a magnetic sensor or as a magneto-optical storage element.

12 Claims, No Drawings

MAGNETIC COMPONENT

BACKGROUND OF THE INVENTION

The present invention relates to an element comprising a substrate with a surface roughness of less than 5 nm, with saturated bonds on the surface and an MPt$_3$ film applied to at least one side of the substrate, with a magnetic anisotropy perpendicular to the plane of the film, and whereby M is selected from a metal of the 5$^{th}$ to 9$^{th}$ sub-group of the periodic table, nickel or gadolinium. The invention further relates to a method for production of the above and the use of said elements as a magnetic component, for example as a magnetic sensor or as a magneto-optical storage element.

Thin alloy films applied onto a substrate are employed, among other things, as magnetic or magneto-optical storage media. In such cases, alloy films of this type meet the requirements to guarantee a high write/read stability and simple manufacturing—especially requirements such as perpendicular magnetic anisotropy, which means: the preferred magnetizing direction is perpendicular to the plane of the film, having 100% remanence, a Curie temperature in the range of 100° C. to 500° C., a suitable temperature dependence of the coercive force. The crystal particles, which form on such films, should have a small grain size therein. The grain size of such crystal particles lies presently at approximately 20 nm.

A possibility to develop storage media with higher storage densities exists, among other things, by reducing the grain size of the film-forming crystal particles, which can lead to a reduction of the bit-storage capacity. However, this causes inevitably problems for thermal stability (superpara magnetic limit) of the stored information and limits the obtainable storage density. Materials having a higher magnetic anisotropy, should nevertheless remain stabile at smaller grain size of the film-forming crystal particles.

Magnetic storage media with a high, perpendicular anisotropy have pertinent advantages compared to traditional storage media with a longitudinal anisotropy such as a stabilization of stored information (bit) against demagnetization and they have thereby a higher storage density.

At the present, there are predominantly materials employed that are formed from ternary systems, as for example CoPtCr alloy systems. However, manufacturing of such systems requires complicated and cost-intensive processing steps, in particular, the thermal activation of individual alloy elements.

Even in binary alloy systems, there can be found good magnetic or magneto-optical properties. Appl. Phys. Lett 69 (8), pages 1166 through 1168, describe, for example, the structural and magnetic properties of Fe$_x$Pt$_{1-x}$ films, which show a large Kerr rotation. Even Co—Pt alloy systems or prior art are distinguished by a large Kerr rotation, for example. Tests of CoPt$_3$(111) alloy films on a Pt(111) nucleus layer produced by molecular beam epitaxy have shown that a long-trajectory, chemically grouped fcc(111) phase (L1$_2$ phase) is formed only at a vapor deposition temperature between 550° C. and 700° C. during which all Co atoms occupy the corners of the elementary cell and the Pt atoms are disposed in the plane center. Volume diffusion must be greatly increased through thermal activation, which means a temperature of 550° C. to 700° C. is absolutely necessary to maintain this ordered structure. However, films manufactured in this manner show a longitudinal anisotropy. The preferred perpendicular anisotropy for magnetic application occurs only at vapor deposition temperatures in the range of 200° C. to 400° C. This characteristic is the result of growth-induced processes (segregation tendency).

BRIEF SUMMARY OF THE INVENTION

The present invention has therefore the object to provide magnetic components, such as magnetic sensors or magneto-optical storage elements, which can be produced by vapor-deposition of a layer on a substrate at low deposition temperatures whereby the magnetic layer or the magnetic film should distinguish itself by a high, perpendicular magnetic anisotropy and whereby the grain size of the crystal particles forming the magnetic layer should be less than 20 nm.

This object is achieved through the embodiments characterized in the claims.

In particular, there is an element or elements provided whose substrate comprises a surface roughness of less than 5 nm, saturated bonds on the surfaces, an MPt$_3$ film applied to at least one side of the substrate, and a magnetic anisotropy perpendicular to the plane of the film, whereby M is a metal selected form the 5$^{th}$ to 9$^{th}$ sub-group of the periodic table, nickel or gadolinium.

The substrates used in the invention distinguish themselves by the so-called Van der Waals surfaces and they show extremely little surface roughness of less than 5 nm, for example, in the range of 1 to 5 nm, preferably smaller than 2 nm, as it is measured by scanning force microscopy or scanning tunnel microscopy (STM). The substrate surfaces are chemically passive surfaces and they are thereby inert, which means, there are no free covalent or ionic bonds on the surfaces. Based on this specific surface quality of the substrate used in the invention, very weak surface bonds are developing to the adsorbed atoms, which means, atoms adsorbed on a surface, so that they show a highly increased surface mobility in return. In addition, there is made possible a strong "de-crosslinking" growth behavior based on the weak bond to the adsorbed atoms that leads to a granular-type crystal growth (Volmer-Weber growth mode). This highly pronounced Volmer-Weber growth mode effects inevitably a granular-type crystal growth that leads to a reduction in grain size at corresponding conditions whereby the storage density can be increased in turn.

DETAILED DESCRIPTION OF THE INVENTION

A material may principally be employed as substrate material which shows the above-mentioned surface characteristics, which means, as long as the substrate material has a high surface quality and a weak bond (Van der Waals interchange effect) to the adsorbed atoms—which makes possible thereby a higher surface diffusion of adsorbed atoms in relation to metallic substrates, e.g. platinum.

In a preferred embodiment of the present invention, the substrate is selected from a group consisting of semiconductor films, graphite films or polymer films. Particularly MoSe$_2$, MoS$_2$, ReSe$_2$, Wse$_2$ or WS$_2$ can be used as semiconductor films in an advantageous manner. An extremely high surface diffusion of adsorbed atoms has been detected in the use of such semiconductor films. For example, the surface diffusion or surface mobility of cobalt and platinum, vapor-deposited as adsorbed atoms on a WSe$_2$ substrate at room temperature, is hundred times greater than on a Pt(111) substrate. Moreover, it is possible to manufacture the above-described semiconductor films at high quality, simple, with a large surface, and by being cost-effective, which are essential requirements for commercial production of such magnetic components, for example magnetic sensors or magneto-optical sensors.

The polymer films used as a substrate have no restrictions relative to the polymeric material used as long as the above-described requirements for the surface characteristic have been fulfilled. Polyolefines are preferably used as polymer film material, which are capable of providing said Van der Waals surfaces and which distinguish themselves by the surface roughness characterized in the invention. For example, such polyolefines can be polystyrene, polyethylene, polypropylene, poly(meth)acrylic acid or partially or fully fluorinated polyolefins, as for example Teflon®. Such polymer films, having the above-described surface characteristics, may be obtained through the spin-coating method on silicon substrates or glass substrates.

In another preferred embodiment of the inventive element, the metal M in the $MPt_3$ film has been selected to be cobalt, chromium, gadolinium, iron, nickel, manganese or vanadium, especially preferred is cobalt. In an especially preferred embodiment, the $MPt_3$ film is a granular-type film that is formed from monocrystal fcc-$CoPt_3$ grains that have no chemical order.

The crystal particles, forming the $MPt_3$ film of the inventive element, have preferably a grain size in the range of 2 to 20 nm or higher, preferably 2 to 8 nm. The thickness of the $MPt_3$ film applied to the substrate can be 2 nm to 200 nm in dependence on the number of deposited, adsorbed atom layers. The inventive substrate has no restriction relative to the thickness. For example, the thickness of the inventive substrate can be 2 nm to 0.1 mm. The substrate used in the invention may in turn be deposited as a thin film or thin layer on a carrier or a carrier substrate, such as glass or ITO, for example.

An additional object of the present invention is providing a method for manufacturing such an element, comprising the following steps:

(a) Providing a substrate as described above in a deposition device and (b) depositing, at the same time, Pt and a metal M selected from the $5^{th}$ to $9^{th}$ sub-group of the periodic table, nickel or gadolinium, having a deposition rate in the range of 0.001 to 5 nm/s, preferably 0.001 to 0.2 nm/s, whereby the deposition temperature lies at a range of 0° C. to 700° C., preferably 0° C. to 200° C., or especially preferred 20° C. to 200° C., during the formation of an $MPt_3$ film on the substrate.

Under deposition temperature there is understood the temperature of the utilized substrate. The disposition rate could be separately adjusted, for example, by means of a crystal oscillator or a mass spectrometer arranged in the depositing device. Deposition of platinum and the metal M is performed preferably by means of molecular beam epitaxy or sputter technology; however, deposition by means of CVD or MOCVD methods is conceivable as well. In a preferred embodiment and in the framework of the inventive method, there is a deposition device used as a vacuum chamber having a basic pressure in the range of $10^{-4}$ Pa to $10^{-9}$ Pa, preferably $10^{-6}$ Pa to $10^{-8}$ Pa. In an additional preferred embodiment of the inventive method, Pt and the metal M are heated and evaporated by means of an electron-beam evaporator. A high-power electron beam is pointed onto a solid-state surface of the material to be vapor-deposited or deposited. This type of method is advantageous in that material with a high melting point can be deposited as well.

Magnetic $MPt_3$ films or layers can be surprisingly obtained at already low deposition temperatures by means of the inventive method and through the specific use of the above-described substrates, which have a weak bond to the adsorbed atoms as a result of Van der Waals-type surfaces, whereby said films distinguish themselves by a high, perpendicular magnetic anisotropy, and whereby the grain size of the crystal particles forming the magnetic layer is less than 20 nm, which in turn is favorable for the increase of storage density in the framework of its utilization, e.g. as magnetic sensor or magneto-optical storage element. It is possible, for example, to obtain a granular-type $CoPt_3(111)$ film on $WSe_2(0001)$ already at room temperature as a deposition temperature or vapor-deposition temperature in an fcc-phase and with a magnetic anisotropy perpendicular to the plane of the film.

A further object of the invention is the use of the inventive element as a magnetic component, for example as a magnetic sensor or a magneto-optical storage element.

The present invention is described in more detail by the following example.

EXAMPLE

A molecular beam epitaxy apparatus was used at a basic pressure of $10^{-8}$ Pa for material deposition onto a $WSe_2$ substrate whereby Co and Pt was heated and evaporated by means of an electron-beam evaporator. The substrate was approximately 0.5 m above the Co and Pt vapor-deposition sources and could be brought to the appropriate deposition temperature by means of a heating filament attached to the substrate holding element. The deposition or vapor deposition of a $CoPt_3(111)$ film onto the $WSe_2(0001)$ substrate occurred at room temperature used as deposition temperature and a deposition rate of 0.01 nm/s. A granular-type $CoPt_3(111)$ film was obtained that had a mono-crystalline fcc-phase. Said phase is maintained up to a temperature of 700° C. Additional inventive elements were produced in an analogous manner whereby deposition temperatures were in the range of 20° C. to 200° C.

$CoPt_3(111)$ films vapor-deposited in this manner on a $WSe_2(0001)$ substrate showed a strong magnetic anisotropy perpendicular to the plane of the film, a Curie temperature of approximately 200° C., a coercive force of 200–2000 Oe and 100% remanence.

At the initial stage of the crystal growth of $CoPt_3$ on $WSe_2$, there was observed a well-defined size distribution of crystallites, which were mono-crystalline and which had a typical grain size of approximately 3 nm. The crystallites grow with increasing film thickness and form a granular-type film structure. The grain size of these crystallites lies between 5 and 10 nm for $CoPt_3$ films having a thickness of 5 nm, whereby said crystallites were vapor-deposited at room temperature (20° C.), which is favorable for high storage densities.

The invention claimed is:

1. An element comprising a substrate having a surface roughness of less than 5 nm, no free covalent or ionic bonds on the surface, magnetic layer directly applied to at least one side of the substrate at a deposition temperature of 20 to 200° C., and a said magnetic layer possessing a coercivity of at least 200 Oe magnetic anisotropy perpendicular to the plane of the layer, wherein the layer consists essentially of a $MPt_3$ alloys and the grain size of crystal particles forming the magnetic layer is less than 20 nm, wherein M is selected from a metal of the $5^{th}$ to $9^{th}$ sub-group of the periodic table, nickel or gadolinium, wherein the substrate is selected from the group consisting of semiconductor films, graphite films and polymer films, and wherein said substrate possesses a higher surface mobility of adsorbed M and Pt atoms relative to a metallic platinum substrate.

2. An element according to claim 1, wherein said semiconductor film is selected from the group consisting of $MoSe_2$, $MoS_2$, $ReSe_2$, $WSe_2$ and $WS_2$.

3. An element according to claim 1, wherein the polymer film is formed from polyolefin selected from the group consisting of polystyrene, polyethylene, polypropylene, poly(meth)acrylic acid or partially or fully fluorinated polyolefins.

4. An element according to any one of claim 1, 2 or 3, wherein M is selected from cobalt, chromium, gadolinium, manganese, iron, nickel or vanadium.

5. An element according to claim 1, wherein said crystal particles forming the $MPt_3$ have a grain size in the range of 2 to 20 nm.

6. An element according to claim 1, wherein said $MPt_3$ layer has a thickness of 2 nm to 200 nm in one region.

7. An element according to claim 1, wherein said substrate has a thickness of 2 nm to 0.1 mm in one region.

8. An element according to claim 1, wherein said $MPt_3$ layer is a granular-type layer that is formed of monocrystalline $fcc$-$CoPt_3$ grains.

9. A method for the production of an element according to claim 1, comprising the following steps:
(a) providing a substrate as described above in a deposition device and
(b) depositing, at the same time, Pt and a metal M selected from the $5^{th}$ to $9^{th}$ sub-group of the periodic table, nickel or gadolinium, having a deposition rate in the range of 0.001 to 5 nm/s, whereby the deposition temperature lies at a range of 20° C. to 200° C., during the formation of an $MPt_3$ film on said substrate.

10. A method according to claim 9, whereby desposition is performed by means of molecular beam epitaxy or sputter technology.

11. A method according to claim 9 or 10, whereby a vacuum chamber with a basic pressure in the range of $10^{-4}$ Pa to $10^{-9}$ Pa is used as a deposition device.

12. A method according to claim 9, whereby Pt and the metal M is heated and evaporated by means of electron-beam evaporators.

\* \* \* \* \*